(12) United States Patent
Simske et al.

(10) Patent No.: US 7,050,630 B2
(45) Date of Patent: May 23, 2006

(54) SYSTEM AND METHOD OF LOCATING A NON-TEXTUAL REGION OF AN ELECTRONIC DOCUMENT OR IMAGE THAT MATCHES A USER-DEFINED DESCRIPTION OF THE REGION

(75) Inventors: Steven John Simske, Fort Collins, CO (US); David Eugene Auter, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 10/157,093

(22) Filed: May 29, 2002

(65) Prior Publication Data

US 2003/0223637 A1 Dec. 4, 2003

(51) Int. Cl.
*G06K 9/34* (2006.01)
(52) U.S. Cl. ...................... 382/176; 382/173
(58) Field of Classification Search ............... 382/173, 382/176, 180, 181, 260, 278; 715/509, 510, 715/517, 520; 707/200, 500, 502, 509, 510, 707/517, 520; 358/462, 505
See application file for complete search history.

(56) References Cited

U.S. PATENT DOCUMENTS

| | | | | |
|---|---|---|---|---|
| 5,335,290 A | * | 8/1994 | Cullen et al. | 382/176 |
| 5,574,802 A | * | 11/1996 | Ozaki | 382/176 |
| 5,617,485 A | * | 4/1997 | Ohuchi et al. | 382/176 |
| 5,822,454 A | * | 10/1998 | Rangarajan | 382/180 |
| 5,892,843 A | * | 4/1999 | Zhou et al. | 382/176 |
| 5,995,659 A | * | 11/1999 | Chakraborty et al. | 382/176 |
| 6,167,393 A | | 12/2000 | Davis, III et al. | |
| 6,169,998 B1 | | 1/2001 | Iwasaki et al. | |
| 6,298,173 B1 | | 10/2001 | Lopresti | |
| 6,351,559 B1 | | 2/2002 | Zhou et al. | |
| 6,389,169 B1 | | 5/2002 | Stark et al. | |
| 6,397,213 B1 | | 5/2002 | Cullen et al. | |
| 6,542,635 B1 | * | 4/2003 | Hu et al. | 382/173 |
| 6,694,053 B1 | * | 2/2004 | Burns et al. | 382/176 |
| 6,704,450 B1 | * | 3/2004 | Naoi et al. | 382/176 |
| 6,810,404 B1 | * | 10/2004 | Ferguson et al. | 707/200 |

FOREIGN PATENT DOCUMENTS

| | | |
|---|---|---|
| EP | 0947937 | 10/1999 |
| GB | 2362078 | 11/2001 |
| WO | WO 02/17166 | 2/2002 |

* cited by examiner

OTHER PUBLICATIONS

U.S. Appl. No. 10/002,706, filed Oct. 30, 2001, Seaman, et al.

*Primary Examiner*—Andrew W. Johns
*Assistant Examiner*—Amir Alavi (57) ABSTRACT

A method of locating a non-textual region of an electronic document or image that matches a user-defined description of the region includes comparing non-textual regions of each of a corpus of electronic documents with the user-defined description and identifying non-textual regions of the electronic documents that match the user-defined description according to pre-determined criteria. A system for locating a non-textual region of an electronic document or image based on a user-defined description of the region includes a user interface for creation of the user-defined description of the region, and a zoning analysis engine for segmenting the electronic document into regions including non-textual regions, comparing the non-textual regions with the user-defined description and identifying non-textual regions which match the user-defined description according to pre-determined criteria.

35 Claims, 6 Drawing Sheets

Quality Control Example:
Sample Metadata Extraction Rules (MER)

* Generate histogram for each of four target regions
* Find pixels for x% of histogram, where x = 5 & 95
* Find range for x=95% - x=5%
* Calculate the MTF in both directions by using the appropriate two target regions

— 124

105 —

The Primitive Algorithms:
* ComputeHistogram()
* ComputeHistogramPctPoint(x), where x =5, 95
* Subtraction
* Division

— 125

Some Additional Primitive Algorithms:
* ComputeProjectionProfile(d), where direction d = x,y
* FindProjectionProfilePeaks()
* Multiplication
* Addition 0.1
406

Fig. 5

SYSTEM AND METHOD OF LOCATING A NON-TEXTUAL REGION OF AN ELECTRONIC DOCUMENT OR IMAGE THAT MATCHES A USER-DEFINED DESCRIPTION OF THE REGION

FIELD OF THE INVENTION

The present invention relates generally to the field of digital document processing. More particularly, the present invention relates to a system and method of locating a non-textual region of an electronic document or image that matches a user-defined description of the region.

BACKGROUND OF THE INVENTION

With the advent of affordable, large-volume media-storage, many people and organizations are moving to massive digital archiving of images and documents. This movement ranges from simple home photograph collections to extremely sophisticated databases used by international corporations that include digital images and documents that may combine text with pictures or graphics. Unfortunately, searching and retrieving images and documents from these databases is not a trivial task.

Digitizing and scanning documents to create electronic versions, storing the electronic version in some form of electronic storage media, and subsequently searching these documents is not a new technology. In fact, there are numerous systems, commercial and otherwise, that have been developed over the past few years to deal with this very issue. One of the greatest advantages of such a searchable document system is the ability to quickly and efficiently search through large amounts of data for a very small percentage of "target" material.

Current document management systems perform reasonably well when working with documents that are mostly composed of textual information. The main methods of searching an image database are text-based, employing indexing, filenames, subject tags and so forth. Many techniques have been developed for analyzing images and extracting the textual information from those images and converting the text into a form, which can then be processed by the computer. This technology is generally known as Optical Character Recognition (OCR). OCR can be used to capture text from a document to form an index for a searchable database. The text can also be exported into other applications if desired. Relatively speaking, OCR is still in its infancy and no package can claim to be 100% accurate. Thus OCR used for indexing purposes, although very useful, still requires some manual verification, particularly if it is used to key primary fields.

OCR technology has made a significant step in automating the document imaging and searching process for documents composed mainly of text. However, OCR and computer automated processes in general are extremely limited when dealing with non-textual data, especially when contrasted with human abilities. The human visual perception system is excellent at high-speed analysis of images and the identification of objects within them. Indeed, humans can obtain information from an image far faster than from a textual representation of the same data.

SUMMARY OF THE INVENTION

The present invention provides, among other things, a method of locating a non-textual region of an electronic document or image that matches a user-defined description of the region, the method comprising comparing non-textual regions of each of a corpus of electronic documents with the user-defined description and identifying non-textual regions of the electronic documents that match the user-defined description according to pre-determined criteria.

The present invention also provides a system for locating a non-textual region of an electronic document or image based on a user-defined description of the region, the system comprising a user interface for creation of the user-defined description of the region, and a zoning analysis engine for segmenting the electronic document into regions including non-textual regions, comparing the non-textual regions with the user-defined description and identifying non-textual regions which match the user-defined description according to pre-determined criteria.

The present invention also provides computer-readable instructions stored on a medium for storing computer-readable instructions, the instructions causing a computer or processor to segment each of a corpus of electronic documents into textual and non-textual regions, compare the non-textual regions of each the electronic documents with a user-defined description of a target region, and identify non-textual regions of the electronic documents that match the user-defined description of the target region according to pre-determined criteria.

BRIEF DESCRIPTION OF THE DRAWINGS

The accompanying drawings illustrate embodiments of the present invention and are a part of the specification. Together with the following description, the drawings demonstrate and explain the principles of the present invention. The illustrated embodiment are examples of the present invention and do not limit the scope of the invention.

Throughout the drawings, identical reference numbers designate similar, though not necessarily identical, elements.

DETAILED DESCRIPTION OF THE PREFERRED EMBODIMENTS

The present invention provides, among other things, a means and method of identifying user-defined non-textual regions of specified digital images or electronic documents and, if desired, extracting specific descriptive data from those regions. As used herein, and in the appended claims, the term "document" shall be understood to refer to any document containing any combination of text, captions, headings, photographs, pictures, images, graphics, etc. A document can be a photograph, picture or image, with or without text, or any combination of these elements.

Figure 1:
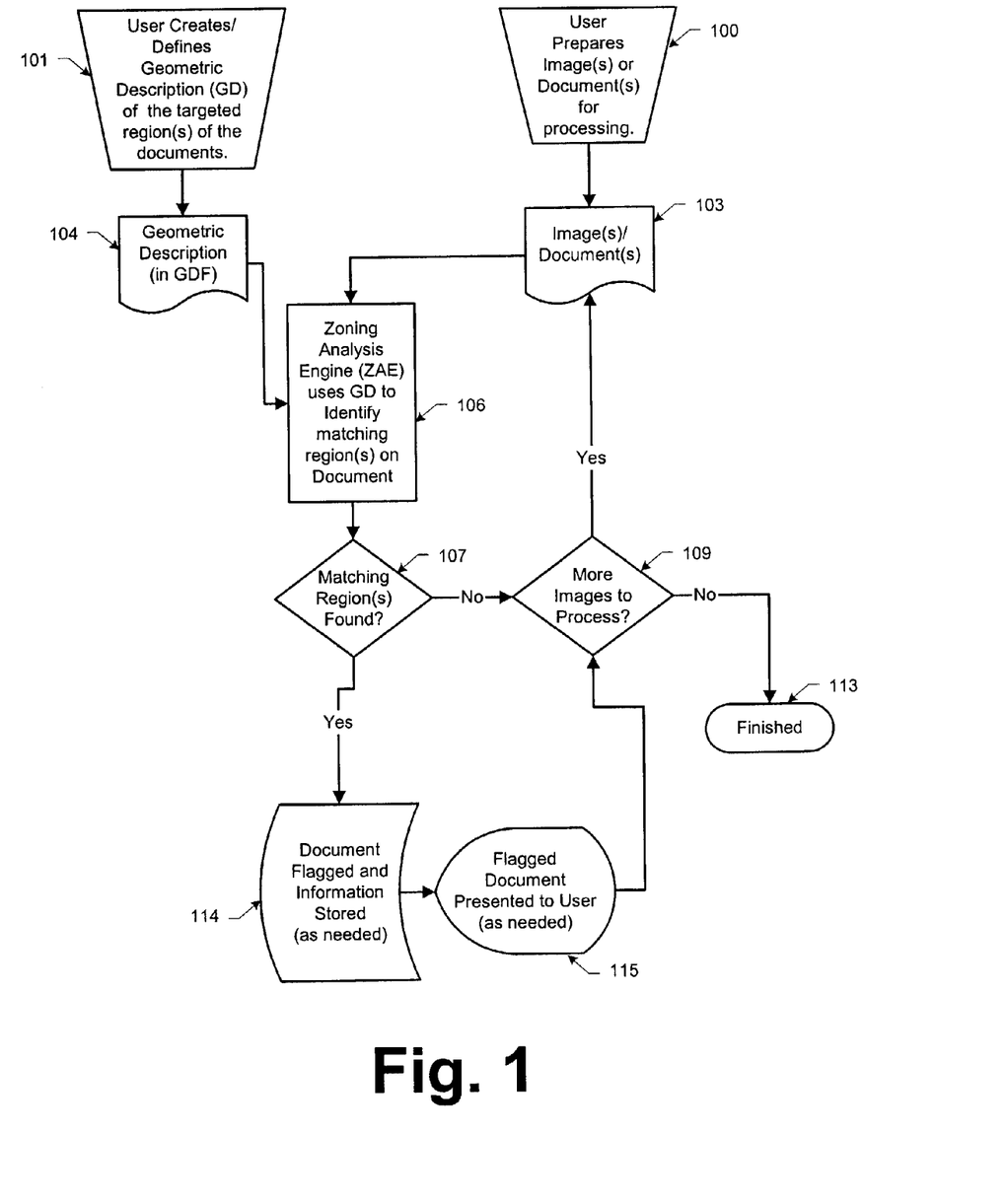
FIG. 1 is a process flow diagram of a system for matching non-textual regions of an electronic document or image with user-defined parameters according to one embodiment of the present invention.

FIG. 1 is a process flow diagram that illustrates an embodiment of the invention. In this process, the user prepares (100) the image(s) and/or document(s) (103) for processing. This may simply involve providing or transferring electronic image or document files to the system. If the images or documents to be processed are in hardcopy form, this step (100) will likely involve operating a scanner or other imaging system to create an electronic version of the documents to be processed. The documents input to the system (100) may be in any format, including, but not limited to, Tagged Image File Format (TIFF), Bitmap (BMP), Graphics Interchange Format (GIF), Joint Pictures Expert Group format (JPG), Portable Document Format (PDF) and PostScript format.

The user also creates a description (101), known as a geometric description (GD) (104), which describes the targeted region(s) of the documents. In other words, GD (104) defines the non-textual region or regions that the user wishes the system to identify in the images or documents provided to the system in (100) described above. The GD is rendered in a standardized format called the Geometric Description Format (GDF). The GD (104) and GDF will be discussed in more detail below. The system compares all non-textual regions of the input documents (100) with the GD created by the user (104). It should be noted that step (100), preparing a document for processing, and step (101), creating a GD for a target region in that document, can be performed in any order.

Once the user has performed preliminary steps (100, 101), the automated system begins processing the electronic images and/or documents (103). GD (104) and a document (103) are sent to a zoning analysis engine (ZAE) (106). ZAE (106) identifies all the non-textual regions in document (103). OCR techniques can be used for this. However, full OCR is not required because the textual regions, once identified, are preferably discarded and need not be converted into editable text. PRECISION SCAN and PRECISION SCAN PRO by Hewlett-Packard Co. are examples of scanning software with the needed functionality to identify textual and non-textual regions in a document. After identifying non-textual regions, ZAE (106) then compares the specifications of GD (104) with each non-textual region in the document (103). ZAE (106) may also convert the incoming image or document (100) to a standard format, e.g., a bitmap format, to facilitate the comparison with the GD (104).

If there is no match (107) between the specifications of the GD (104) and the non-textual regions of the document (103), the processing for this particular document ends. The system then returns to process another document, if one exists (109).

If a match is found, the document may be flagged (114). Additionally or alternatively, the document may be presented or identified to the user (115). The user may then have the option of flagging the document or setting it aside for later use. After handling the identified match, the system then returns to process another document, if one exists (109).

This process repeats until all the images and documents (103) provided to the system (100) or designated for this particular search have been processed. The operation of the system then terminates (113). The user may specify a subset of the corpus of electronic documents available in which to conduct the search for a match to the defined GD (104). As used herein and in the appended claims, the term "corpus" refers to a group of one or more electronic documents.

If a region matching the GD (104) is identified in a document, a record of this match may be created and stored (114). This is particularly useful if the user does not wish to view or further work with or process the identified document at the present time. The record of the match is preferably stored in an Extensible Markup Language (XML) file or database. For example,

```
<TargetRegionFound>
    <Filename>...</Filename>
    <Target relative xmin>...</ Target relative xmin>
    <Target relative xmax>...</ Target relative xmax>
    <Target relative ymin>...</ Target relative ymin>
    <Target relative ymax>...</ Target relative ymax>
</TargetRegionFound>
```

Figure 1A:
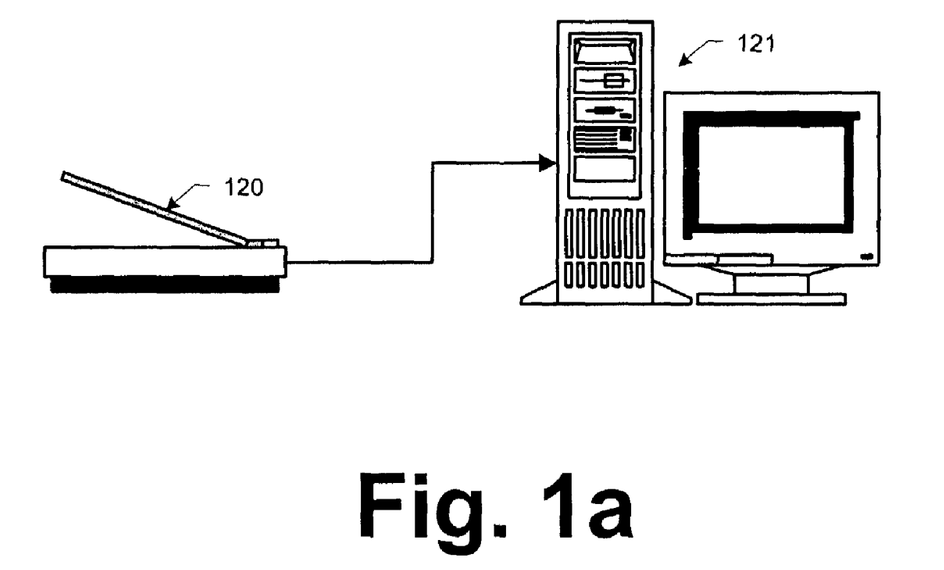
FIG. 1a illustrates a scanner and general-purpose computer which can be used in practicing the present invention.
Figure 2:
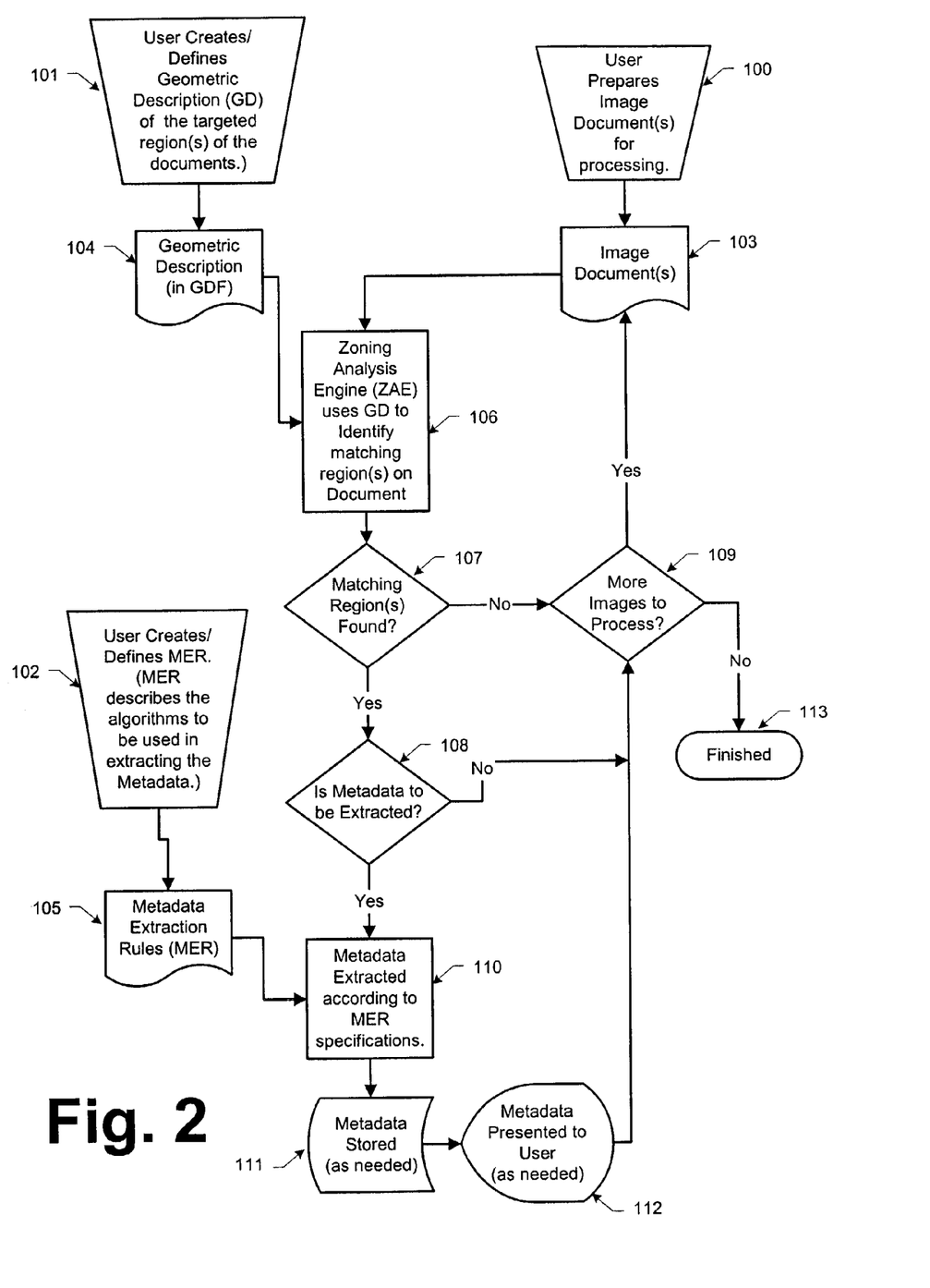
FIG. 2 is a process flow diagram of a system for matching non-textual regions of an electronic document or image with user-defined parameters and extracting metadata therefrom according to another embodiment of the present invention.

"Relative" xmin, xmax, ymin & ymax are used so that the x & y axes are normalized to go from 0 to 100% of full scale, so that the target location is specified independent of pixels/inch (ppi). That way the region can be located no matter how the data is scaled for analysis, e.g. some regions will be evaluated at a specific ppi, other regions will be evaluated at other ppis, and source files of a differing ppi will still be comparable. For example, if a region covers the middle fourth of a page, its relative xmin is 0.25, relative xmax is 0.75, it relative ymin is 0.25, & its relative ymax is 0.75. If the page comes up at 300 ppi and is 11×8.5 inches, then the absolute values are readily computed:

$x$ min=8.5×300×0.25=637.5 pixels $x$ max=8.5×300×0.75=1912.5 pixels $y$ min=11×300×0.25=825 pixels $y$ max=11×300×0.75=2475 pixels The process illustrated in FIG. 1, except for the steps performed by the user, is preferably embodied in a software application that can be run on a general-purpose computer (121) as illustrated in FIG. 1a. FIG. 1a also illustrates a scanner (120) connected to the computer (121). The scanner (120) can be used to digitize hardcopy documents or images. A digitized image may be a sample which forms the basis for a GD or may be an addition to the corpus of documents against which the GD is compared to find a matching non-textual region. The scanner (120) illustrated is a simple flatbed scanner. However any type of scanner could be used in the practice of the present FIG. 2 shows another embodiment of the present invention where the user is not only interested in locating documents that have a non-textual region matching the GD (104), but also wishes to extract data from those regions (108). This extracted data can be described as metadata about the region from which it was extracted. Metadata is data that describes other underlying data, i.e., data about data.

In this embodiment, the user performs three preliminary steps. Steps one (100) and two (101) are identical to the previous example. In step three (102), the user is responsible for preparing the metadata extraction rules (MER) (105) which are rules, e.g., specific algorithms, to be used in extracting the specific data required by the user from regions which have been identified as matching the GD (104). The MER (105) will be discussed in more detail below.

The process flow in FIG. 2 is substantially identical to the previous process up to the point that a match is found (107) by the ZAE (106). Once the user has performed the preliminary steps (100, 101, 102), the automated system begins processing the electronic images and/or documents (103). The GD (104) and a document (103) are sent to the zoning analysis engine (ZAE) (106). ZAE (106) identifies all the non-textual regions in the document (103). The ZAE (106) then compares the specifications of the GD (104) with each non-textual region in the document (103).

If there is no match (107) between the specifications of the GD (104) and the non-textual regions of the document (103), the processing for this particular document ends. The system then returns to process another document, if one exists (109).

However, once a document containing a non-textual region that matches the GD (104) is located, metadata is extracted (110) from the matching non-textual region of that document (103) according to the provisions of the MER (105). When the metadata has been extracted, the information is preferably stored in a database (111). Additionally or alternatively, the extracted metadata may be presented to the user (112) for review.

After each document is checked (107) for non-textual regions matching the GD (104), the system returns to process another image, if one exists (109). This is true whether or not a matching non-textual region was discovered in the preceding document. As soon as all the image documents (103) are processed, the system operation terminates (113).

Figure 3:
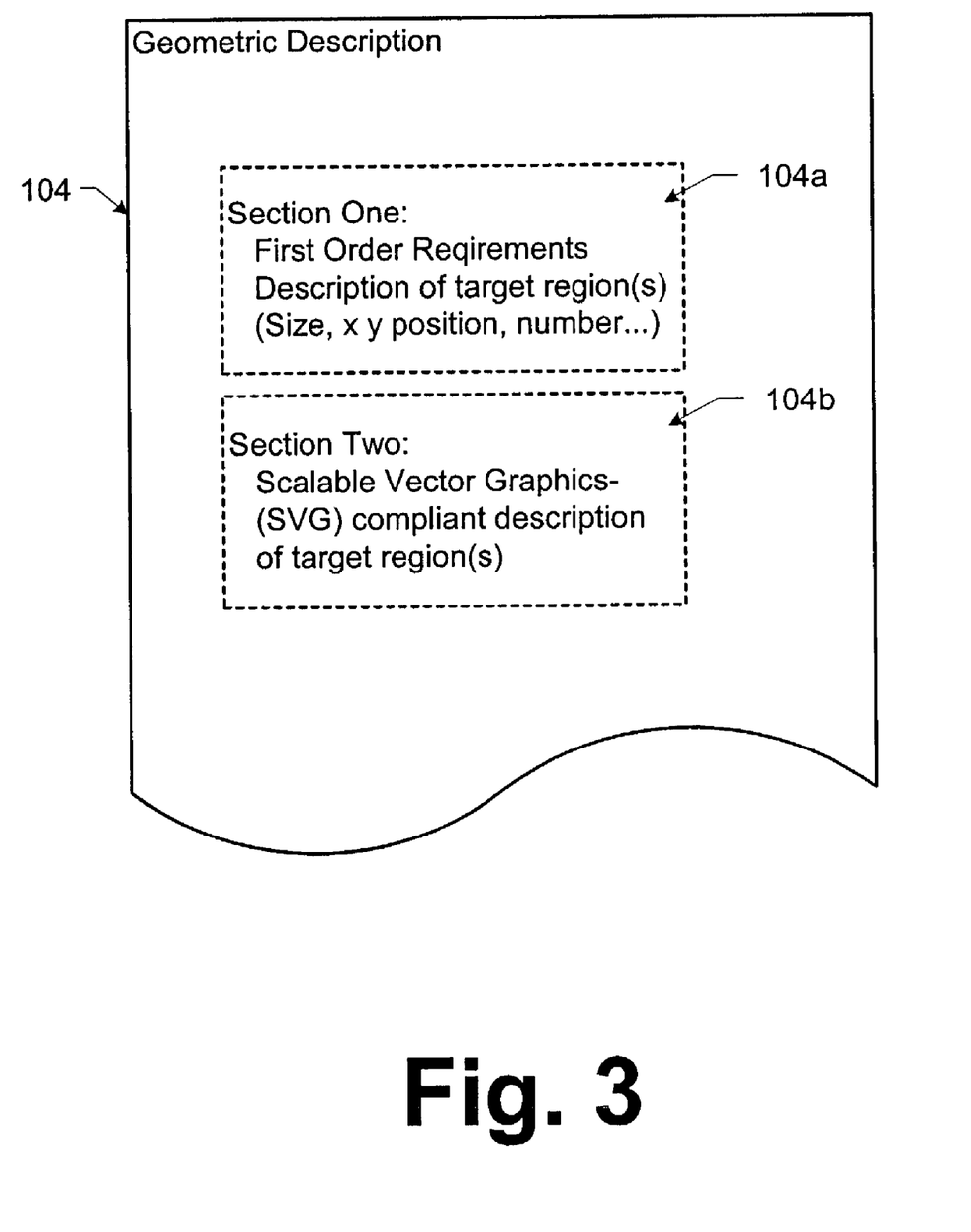
FIG. 3 represents a geometric description that embodies user-defined parameters against which non-textual regions of input documents are matched according to an embodiment of the present invention.

FIG. 3 is a depiction of a geometric description (GD) (104) according to the present invention. GD (104) preferably is an electronic document of XML or some other standardized language. The language used is not particularly important, but XML quite readily lends itself to this type of application.

The GD (104) is rendered in a standardized format referred to herein as the Geometric Description Format (GDF). The exact specifications and details of this format are not necessarily important to practice of the invention. Such specifications and details can be selected and defined as suits a particular application. The ZAE preferably receives to GD (104) in an expected and standardized format so tat the comparison wit non-textual regions of a document being processed can be facilitated.

In a preferred example, presented in XML, the GDF may include the following information in the following organization:

```
<GDF>
<Number of Regions>...</Number of Regions>
<Region>
    <MinWidth>...</MinWidth>
    <MaxWidth>...</MaxWidth>
    <MinHeight>...</MinHeight>
    <MaxHeight>...</MaxHeight>
    <RelativeXmin>...</ RelativeXmin>
    <RelativeXmax>...</ RelativeXmax>
    <SVG Description>
        //SVG-compliant description of the region here ...
    </SVG Description>
    //Other user-directed size, eccentricity, histogram & intra-region
    //dependency specifications here...
</Region>
...
</GDF>
```

The user need not know XML syntax and formatting to generate such a GD, however. Rather, the GD can be generated in proper XML automatically from a simpler data entry form presented to the user or even from a series of specifically ranged user interface controls such as buttons, radio buttons, list boxes, combo boxes, text boxes, sliders, etc.

The GD (104) can be created by the user in numerous ways. One example is using the data entry form or user interface just described. The simplest way, from the user's perspective, is to have a properly-programmed computer analyze a sample of the region or regions the user wishes to identify and automatically generate a GD (104) from this analysis. The programming for a computer to generate a GD from a sample will depend on the specifications and details of the GD scheme adopted in any specific application and will be within the ability of one ordinarily skilled in the art having the benefit of this disclosure. The sample used may be an electronic file or may be a hardcopy sample that is then scanned to generate an electronic version. In either case, the system can then take the electronically-rendered sample and generate a GD (104) in accordance with the sample. In such a case, the system will recognize an error tolerance for the parameters obtained by analyzing the sample. Preferably, this error tolerance will be, for example, ±5%. Alternatively, if multiple samples are scanned, ±3 standard deviations instead of ±5% can be used as the error tolerance. This is a typical simple statistical heuristic for determining outliers, and allows an "automatic, adaptive" error tolerance to be obtained when the user has several samples.

Alternatively, the user can specify the parameters of the GD (104) using a user interface. This could also include selecting a sample region from within a larger image or document using, for example, a graphical user interface such as a scanner preview window or a PDF viewer such as Adobe ACROBAT.

In either of these cases, the user will preferably be able to override any parameter of the GD (104) created by automatic analysis of a sample. This could be done by, for example, a right-click menu, a pull-down menu or a user-interface specifically designed for the generation of a GD (104) from a sample or from other user-specified parameters. The manner of creation of the GD (104) is unimportant, so long as the GD (104) describes the non-text region of a document that the user wishes to find.

As shown in FIG. 3, the GD (104) is preferably comprised of two sections. Section One (104a), also known as the First Order Requirements, consists of a description of the target region. This description will typically contain the height and width of the target region, the eccentricity and/or histogram of the target region, and/or the number of target regions and a region-to-region orientation when multiple regions are specified. Section One may further include any other useful and pertinent descriptive data. The data for Section One can be taken from a bitmap image of a sample being scanned or can be specified by direct user input.

In many instances, the data in Section One will be sufficient, without more, to identify the target regions sought by the user in the corpus of electronic documents to be searched. This will particularly be the case where a high-quality sample is used to generate the data of Section One (104a) of the GD (104).

However, the data in Section One can be supplemented with the data of Section Two (104b) to better ensure that the system of the present invention identifies or correctly identifies the regions desired by the user in the documents being searched. The two sections (104a, 104b) of the completed GD (104) can be used at separate points during the inspection by the ZAE (106) as will be described in more detail below. Section Two (104b) is also known as the scalable vector graphics (SVG) description of the target region. The SVG description (104b) of the GD (104) contains an SVG description of the target regions or regions the user wishes to identify in the documents being searched. The SVG standard is an open XML specification for describing vector graphics that allows the described graphics to be scaled, rotated, and otherwise electronically manipulated. An SVG standard has been promulgated by the World Wide Web Consortium (W3C) and is available at http://www.w3.org/TR/SVG/. This SVG standard may be, and preferably is, used with the present invention. In other words, the SVG description of the target region in Section Two (104b) preferably complies with the W3C SVG standard.

In the present invention, if the user is creating the GD (104) with a sample, the sample is scanned and eventually rendered in bitmap form. The bitmap can then be converted to vector form and described using the SVG standard.

Figure 4:
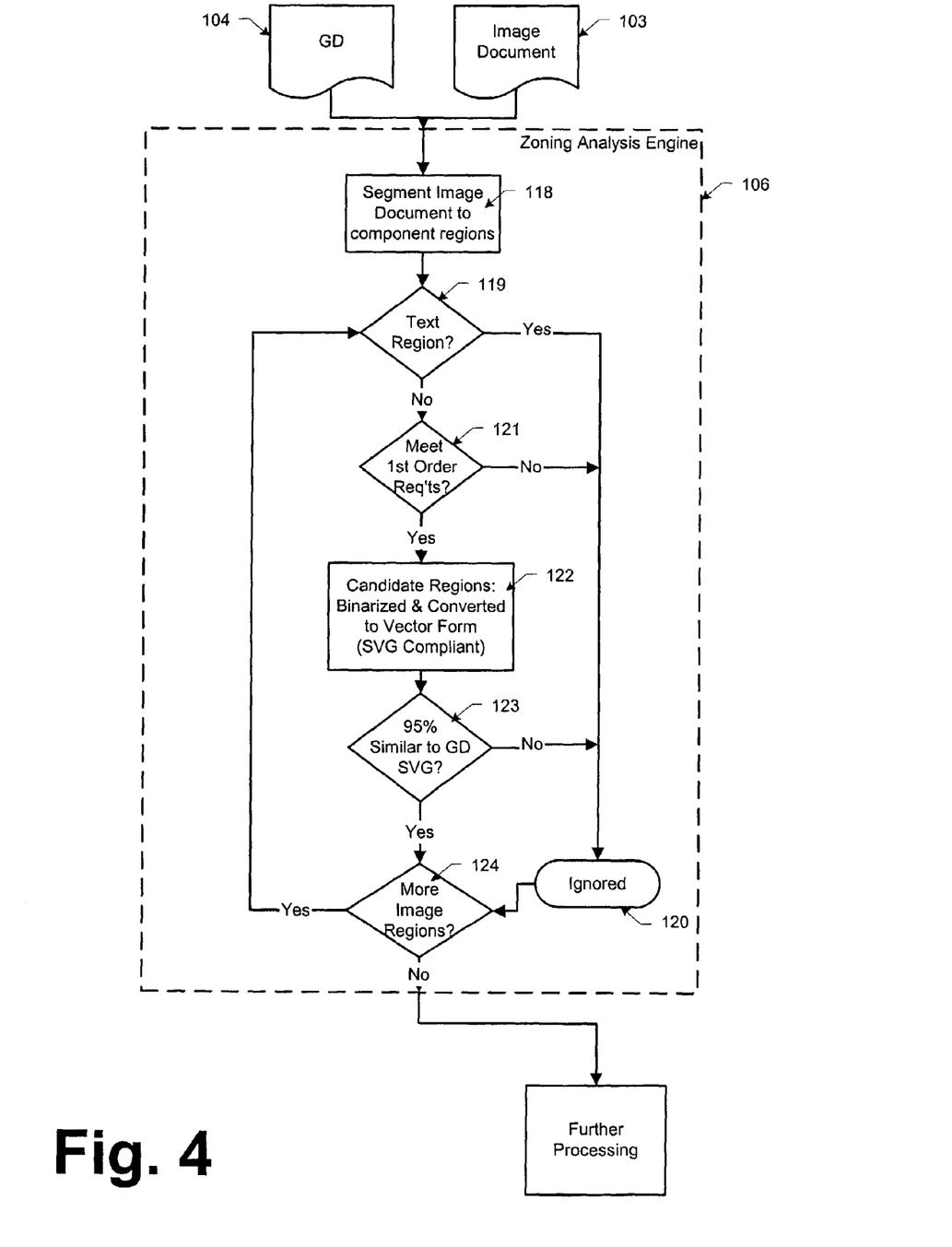
FIG. 4 is a detailed flow diagram of the operation of an embodiment of a zoning analysis engine of the present invention.

FIG. 4 is a more detailed process flow diagram of the operation of ZAE 106. The GD (104) and the image document (103) are sent to the ZAE (106). The first step within ZAE (106) is to deskew the image document, if necessary, and then segment the image into its component regions (118). The component regions are then analyzed by Precision Scan™, OCR or similar technology to determine whether they are text or non-text regions (119). Any text regions are ignored (120). The remaining regions are subsequently compared with Section One (104a) of the GD to determine whether they meet the first order requirements (121). Any regions not meeting the first order requirements do not match the region the user is searching for as defined by GD (104) and are ignored (120).

Regions that meet Section One (104a) requirements can be considered as matching the GD (104) and identified as the regions for which the user is searching. This would give a rough search result that may, in some cases, be entirely adequate.

Alternatively, the regions that meet Section One (104a; FIG. 3) requirements become candidate regions that are subject to further comparison with the Section Two (104b; FIG. 3) data of the GD (104). To perform this further comparison, the candidate regions are binarized and converted to SVG-compliant vector graphics (122). This conversion is performed with binary-to-vector conversion software which is part of or called by ZAE (106).

The SVG description of the candidate region is then compared to Section Two of the GD (104b), which is the SVG-compliant description of the region for which the user is searching. Matching is based on the similarity of the two images. The percent of shared area (computed separately from the SVG specification) is a good means of correlating the two SVG descriptions. For example, regions that overlap by more than 95% are generally considered "matching" (123). The criteria for matching multiple regions can be relaxed somewhat (when the target described in GDF comprises two or more regions on the page), because allowing a higher "false positive" rate for one region (e.g. 10% non-overlap) is offset by the low error rate for duplicate matches if the region sets really are different. The 10% non-overlap is simply adding 5% tolerance for two regions. A more exact scaling to two regions (in statistical terms) might be $1-(95\%)(95\%)=9.75\%$, but 10% will usually be sufficient.

Orientation differences between the template and the candidate regions are readily handled by rotating one image 90, 180, or 270 degrees with respect to the other before eliminating them from either the candidacy set or the final "matching" set.

If there are more regions to be analyzed (124), the process returns to the text test (119) within the ZAE (106). After all of the regions have been analyzed, the matched images, if any, are further processed. As mentioned previously, further processing could simply mean flagging the documents and/or showing the user the matching regions, or it could mean a more extensive process of analyzing, extracting, and storing metadata from the particular region(s).

When extracting metadata from the regions, the procedure for extracting the data is specified in a set of metadata extraction rules (MER) (105). The MER, like the GD, will preferably be recorded in an XML document, but may take other forms. The MER need not be entered by the user in XML syntax and format. Rather, like the GD described above, the MER can be entered through an entry form or a user interface with standard input device such as buttons, radio buttons, etc. The MER can then be automatically generated as an XML file based on the user input.

The MER rules typically include a variety of algorithms, either built-in or provided by the user, that are performed to provide a useful analysis of the identified region. Any algorithm for analyzing a non-textual region of an electronic image or document could be used and would be within the scope of the present invention. Some examples are operations on the rows and columns of pixels (projection profiles), histogram analyses (the number of peaks, percent black vs. white pixels, etc.), determining principal colors (palette generation), etc.

If the identified region is, for example, a bar graph or a pie graph or the like, the data extracted could be the result of a comparison of the size of elements in the bar graph or, with color discrimination, the pie graph. Thus, an approximation of the raw data used to generate the graph could be extracted as metadata from this analysis of the electronic version of the graph.

In many cases, only one or a few of the documents in a large set of documents will have regions that match the GD (104) the user has specified. One particular application of the present invention of which this is true is in quality control for scanning books. To render a book in electronic form, each page of the book is scanned. Typically, a single page of the book being scanned has a modulation transfer function (MTF) target attached. The MTF is a symbol comprised of vertical and horizontal lines separated by varying spaces. Its function is to allow the quality of the scanning of the book to be assessed.

As related to the present invention, the definition of the MTF target or targets could be included in the GD (104). The relative positioning of the MTF targets on the page would be described in Section One (104a) and the actual geometry of the MTF targets (the horizontal and vertical lines and corresponding spaces) would be described by Section Two (104b). The file or files created by scanning the book is/are searched by an embodiment of the present invention for the scanned image of the MTF target. When located, the scanned image of the MTF target is used according to known techniques to assess the scan quality of the pages scanned from the book.

Figure 5:
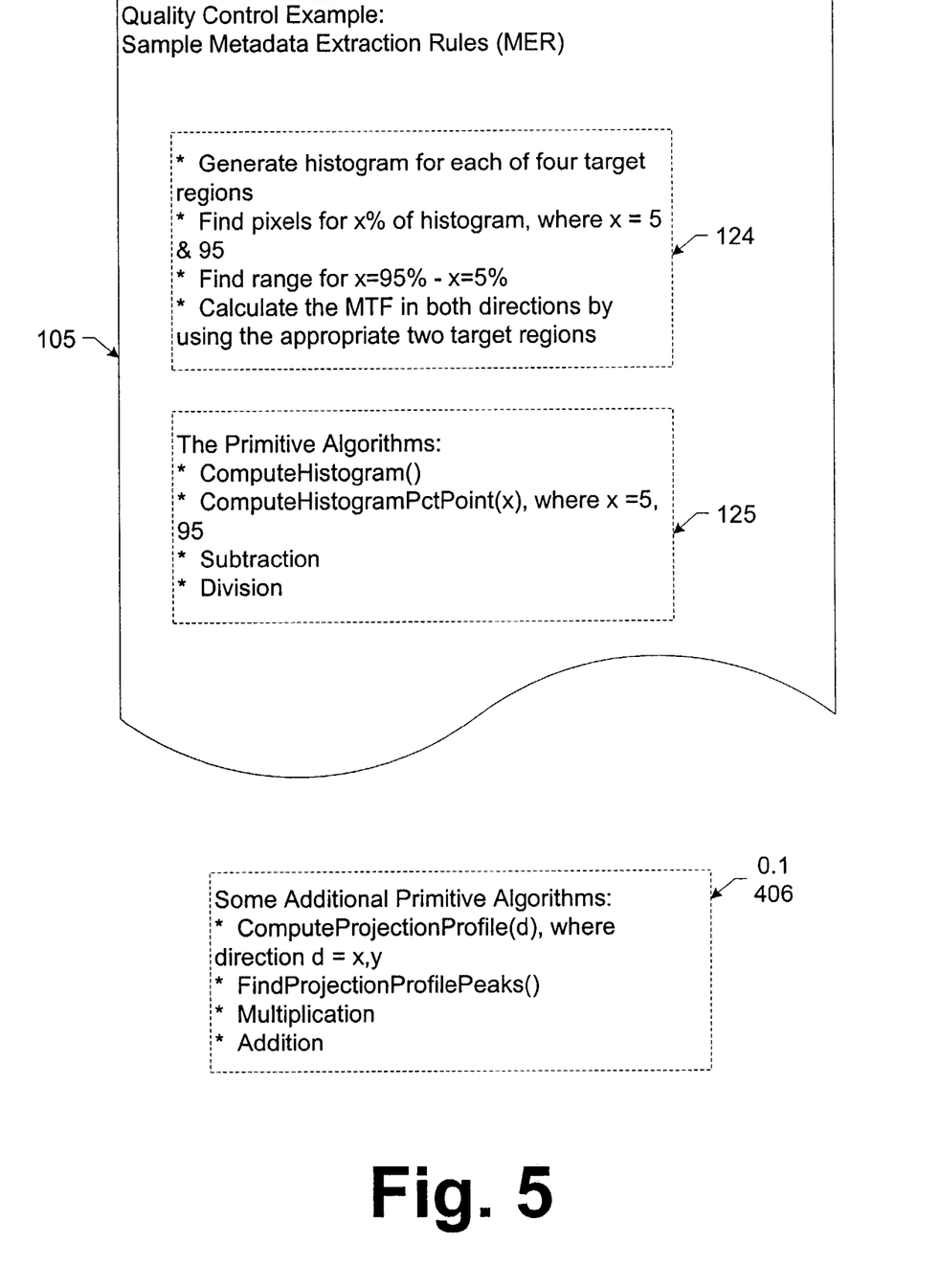
FIG. 5 illustrates an example of an embodiment of a metadata extraction rule document according to the present invention.

FIG. 5. outlines a sample MER set (105) that could be used for analyzing such an MTF target. In the example, the basic steps of the algorithms are outlined (124) and the corresponding primitive algorithms are shown (125). The steps of the algorithm include: (1) Generate histogram for each of four target regions; (2) Find pixels for x% of histogram, where x=5 & 95; (3) Find range for x=95%–x=5%; and (4) Calculate the MTF in both directions by using the appropriate two target regions. The primitive algorithms may include: (1) ComputeHistogram( ); (2) ComputeHistogramPctPoint(x), where x=5, 95; (3) Subtraction; and (4) Division. These algorithms can be supplemented with, for example, the additional primitive algorithms (126) that are illustrated, e.g., (1) ComputeProjectionProfile(d), where direction d=x,y; (2) FindProjectionProfilePeaks( ); (3) Multiplication; and (4) Addition.

Obviously, this is not an exhaustive list. There is an infinite number of algorithms that could be developed and used to extract data from a non-textual region of an electronic document. However, even with the eight simple algorithms listed, several further applications for the present invention become readily apparent.

What is claimed is:

1. A method of locating a non-textual region of an electronic document or image that matches a user-defined description of said region, said method comprising:
   comparing non-textual regions of each of a corpus of electronic documents with said user-defined description;
   identifying non-textual regions of said electronic documents that match said user-definer description according to pre-determined criteria; and
   retrieving documents from said corpus that match said user-defined description and identifying said retrieved documents to a user.

2. The method of claim 1, further comprising generating said user-defined description using scalable vector graphics.

3. The method of claim 1, further comprising generating said user-defined description by scanning a sample of said non-textual region.

4. The method of claim 3, further comprising setting an error tolerance for said user-defined description based on a number of samples scanned to generate said user-defined description.

5. The method of claim 1, further comprising extracting data from a non-textual region identified as matching said user-defined description.

6. The method of claim 5, further comprising defining a set of algorithms that are performed on said non-textual region identified as matching said user-defined description to extract said data from said non-textual region.

7. The method of claim 1, further comprising contributing documents to said corpus of electronic documents by scanning hardcopy documents.

8. The method of claim 1, further comprising flagging an electronic document containing a non-textual region that matches said user-defined description.

9. The method of claim 1, wherein said non-textual region is a modulation transfer function target, said method further comprising:
   using said modulation transfer function target from said electronic documents to assess scan quality of said electronic documents.

10. The method of claim 1, wherein said user-defined description includes Scalable Vector Graphics standard-compliant description of a non-textual region that said user desires to locate within said corpus of documents.

11. The method of claim 1, wherein said user-defined description includes any of eccentricity, histogram or intra-region dependency specifications of a non-textual region that said user desires to locate within said corpus of document.

12. The method of claim 1, wherein said user-defined description is not based entirely on line intersections.

13. The method of claim 1, wherein said user-defined description includes relative maximum and minimum dimensions of a non-textual region.

14. The method of claim 1, wherein said user-defined description is rendered in Extensible Markup Language (XML).

15. The method of claim 14, further comprising automatically converting user input into said user-defined description in Extensible Markup Language (XML).

16. The method of claim 1, wherein identifying non-textual regions that match said user-defined description comprises rotating candidate regions for comparison with said user-defined description in a plurality of orientations.

17. A system for locating a non-textual region of an electronic document or image based on a user-defined description of said region, said system comprising:
   a user interface for creation of said user-defined description of said region; and
   a zoning analysis engine for segmenting said electronic document into regions including non-textual regions, comparing said non-textual regions withh said user-defined description and identifying non-textual regions which match said user-defined description according to prodetermined criteria.

18. The system of claim 17, further comprising a general-purpose computer, wherein said user interface and said zoning analysis engine are provided by an application running on said general-purpose computer.

19. The system of claim 18, further comprising a scanner connected to said computer for generating said electronic document from a hardcopy document.

20. The system of claim 17, wherein said user interface comprises a scanner, said user-defined description being generated in accordance with a sample scanned on said scanner.

21. The system of claim 17, wherein said user-defined description describes said region using the scalable vector graphics standard.

22. The system of claim 17, wherein said zoning analysis engine discards textual regions prior to perfonning said comparing.

23. The system of claim 17, further comprising a processor for retrieving documents from said corpus that match said user-defined description and identifying said retrieved documents to a user.

24. The system of claim 17, wherein said user-defined description includes Scalable Vector Graphics standard-compliant description of a non-textual region that said user desires to locate within said corpus of document.

25. The system of claim 17, wherein said user-defined description includes any of eccentricity, histogram or intra-region dependency specifications of a non-textual region that said user desires to locate.

26. The system of claim 17, wherein said user defined description includes relative maximum and minimum dimensions of a non-textual region.

27. The system of claim 17, wherein said user-defined description is rendered in Extensible Markup Language (XML).

28. The system of claim 27, further comprising a processor for automatically converting user input from said user interface into said user-defined description in Extensible Markup Language (XML).

29. Computer-readable instructions stored on a medium for storing computer-readable instructions, said instructions causing a processor to:
- segment each of a corpus of electronic documents into textual and non-textual regions;
- compare said non-textual regions of each said electronic documents with a user-defined description of a target region; and
- identify non-textual regions of said electronic documents that match said user-defined description of said target region according to pre-determined criteria.

30. The computer-readable instructions of claim 29, further comprising a user interface for allowing a user to create said user-defined description of said target region.

31. The computer-readable instructions of claim 30, wherein said user interface displays a graphic representation of a scanned sample of said target region.

32. The computer-readable instructions of claim 29, wherein said computer readable instructions further cause said processor to extract data from a non-textual region identified as matching said user-defined description of said target region.

33. The computer-readable instructions of claim 32, further comprising a set of algorithms that are performed on said non-textual region identified as matching said user-defined description to extract said data from said non-textual region.

34. The system of claim 33, further comprising means for extracting data from a non-textual region identified as matching said user-defined description.

35. A system for locating a non-textual region of an electronic document or image that matches a user-defined description of said region, said system comprising;
- means for comparing non-textual regions of each of a corpus of electronic documents with said user-defined description;
- means for identifying non-textual regions of said electronic documents that match said user-defined description according to pre-determined criteria;
- means for retrieving documents from said corpus that match said user-defined description and identifying said retrieved documents to a user.

* * * * *

UNITED STATES PATENT AND TRADEMARK OFFICE
CERTIFICATE OF CORRECTION

PATENT NO. : 7,050,630 B2  
APPLICATION NO. : 10/157093  
DATED : May 23, 2006  
INVENTOR(S) : Steven John Simske et al.

Page 1 of 1

It is certified that error appears in the above-identified patent and that said Letters Patent is hereby corrected as shown below:

In column 4, line 52, after "present" insert -- invention. --.

In column 5, line 44, delete "to" and insert -- the --, therefor.

In column 5, line 45, delete "tat" and insert -- that --, therefor.

In column 5, line 45, delete "wit" and insert -- with --, therefor.

In column 9, line 26, in Claim 1, delete "definer" and insert -- defined --, therefor.

In column 10, line 24, in Claim 17, delete "withh" and insert -- with --, therefor.

In column 10, line 27, in Claim 17, delete "prodetermined" and insert -- pre-determined --, therefor.

In column 10, line 43, in Claim 22, delete "perfonning" and insert -- performing--, therefor.

In column 10, line 58, in Claim 26, delete "user defined" and insert -- user-defined --, therefor.

In column 12, line 11, in Claim 35, delete ";" and insert -- : --, therefor.

In column 12, line 17, in Claim 35, after "criteria;" insert -- and --.

Signed and Sealed this

Nineteenth Day of May, 2009

JOHN DOLL  
*Acting Director of the United States Patent and Trademark Office*